US012676903B2

(12) United States Patent (10) Patent No.: US 12,676,903 B2
Bradley et al. (45) Date of Patent: Jul. 7, 2026

(54) METAVERSE CONTEXTUAL COLLABORATION SPACES

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 455 days.

(21) Appl. No.: 17/823,326

(22) Filed: Aug. 30, 2022

(65) Prior Publication Data

US 2024/0070241 A1 Feb. 29, 2024

(51) Int. Cl.
H04L 65/401 (2022.01)
G06F 21/31 (2013.01)
G06T 15/00 (2011.01)
(52) U.S. Cl.
CPC .......... H04L 65/4015 (2013.01); G06F 21/31 (2013.01); G06T 15/00 (2013.01)
(58) Field of Classification Search
CPC ...... H04L 54/4015; G06F 21/31; G06T 15/00
See application file for complete search history.

(56) References Cited

U.S. PATENT DOCUMENTS 7,908,325 B1 * 3/2011 Pabla ...................... G06F 9/542
709/224
9,292,833 B2 * 3/2016 Savage ................... H04L 41/50

(Continued)

FOREIGN PATENT DOCUMENTS

GB 2518244 A * 3/2015 ........... G06F 3/0484
WO WO-2012099617 A1 * 7/2012 ............ G06Q 10/10
WO WO-2019079071 A1 * 4/2019 ........... G06F 18/285

OTHER PUBLICATIONS

Bardram, Jakob, et al. "ReticularSpaces: activity-based computing support for physically distributed and collaborative smart spaces." Proceedings of the SIGCHI Conference on Human Factors in Computing Systems. 2012. (Year: 2012).*

*Primary Examiner* — Shahid K Khan

(74) *Attorney, Agent, or Firm* — Guntin & Gust, PLC; Daniel P. Williams

(57) ABSTRACT

The disclosed technology is directed towards virtual reality collaboration spaces with associated context data. Once created, a virtual reality collaboration space can be pervasively existent, such that the space can be joined or returned to as needed by any admitted participants. The existence of a created collaboration space in association with its collaboration context data can be advertised to specific invitees or general invitees, and can be searchable. In general, upon receiving a reservation request for reservation of a virtual reality collaboration space, a virtual location for the collaboration space is reserved. Access is granted to requesting entities authorized to access the space. Permissions can differ for different invitees, e.g., such that only permitted users can access proprietary information presented as a virtual reality element within the collaboration space. The collaboration space can also be used to drop off virtual reality elements, e.g., from one user to another user.

20 Claims, 17 Drawing Sheets

(56)          References Cited

U.S. PATENT DOCUMENTS

| | | | | |
|---|---|---|---|---|
| 2005/0097440 A1* | 5/2005 | Lusk | ....................... | G06Q 10/10 |
| | | | | 715/752 |
| 2008/0189619 A1* | 8/2008 | Reed | ................... | G06Q 10/109 |
| | | | | 715/751 |
| 2010/0005087 A1* | 1/2010 | Basco | ................. | G06F 16/9536 |
| | | | | 707/E17.017 |
| 2011/0004921 A1* | 1/2011 | Homer | .................... | H04L 63/08 |
| | | | | 726/3 |
| 2013/0227007 A1* | 8/2013 | Savage | ............... | G06Q 10/101 |
| | | | | 709/204 |
| 2015/0109104 A1* | 4/2015 | Fadell | ................. | G08B 27/005 |
| | | | | 340/5.7 |
| 2017/0316608 A1* | 11/2017 | Khalid | .................... | G06F 3/011 |
| 2018/0012191 A1* | 1/2018 | Rosenberg | ............. | H04L 67/01 |
| 2019/0108494 A1* | 4/2019 | Nelson | ............... | G06Q 10/1095 |
| 2021/0133692 A1* | 5/2021 | DeLuca | .................... | G06N 5/02 |
| 2022/0382436 A1* | 12/2022 | Tran | ...................... | G06F 3/0488 |
| 2024/0070216 A1* | 2/2024 | Bradley | ............. | H04N 21/4333 |

* cited by examiner

460

| User ID | Name | Credentials | Real Location |
|---------|------|-------------|---------------|
| UserA | Dr. Joan Studies | CMO, XYZ Labs | x, y, z |

444

| Space ID | Context | Creation Time | Virtual Location | Users Present | Users Invited |
|----------|---------|---------------|------------------|---------------|---------------|
| xyz123 | Alzheimer's in age 40-50 Americans | 10:20 AM EST 12NOV2023 | x1,x2, y1, y2, z1, z2 | UserA | TBD |

460

| User ID | Name | Credentials | Real Location |
|---------|------|-------------|---------------|
| UserA | Dr. Joan Studies | CMO, XYZ Labs | x, y, z |

User Profile Data Store 106

VR Spaces Data Store 108

445

| Space ID | Context | Creation Time | Virtual Location | Users Present | Users Invited |
|----------|---------|---------------|------------------|---------------|---------------|
| xyz123 | Alzheimer's in age 40-50 Americans | 10:20 AM EST 12NOV2023 | x1,x2, y1, y2, z1, z2 | UserA | Alzheimer's Alliance |

446

| Space ID | Context | Creation Time | Virtual Location | Users Present | Users Invited |
|---|---|---|---|---|---|
| xyz123 | Alzheimer's in age 40-50 Americans | 10:20 AM EST 12NOV2023 | x1,x2, y1, y2, z1, z2 | UserA UserB | Alzheimer's Alliance |

| Space ID | Context | Creation Time | Virtual Location | Users Present | Users Invited |
|---|---|---|---|---|---|
| xyz123 | Alzheimer's in age 40-50 Americans | 10:20 AM EST 12NOV2023 | x1,x2, y1, y2, z1, z2 | UserA – FULL ACCESS<br>UserB – FULL ACCESS<br>UserC – LIMITED ACCESS | Alzheimer's Alliance |

447

| Space ID | Context | Creation Time | Virtual Location | Users Present | Users Invited |
|---|---|---|---|---|---|
| xyz123 | Alzheimer's in age 40-50 Americans | 10:20 AM EST 12NOV2023 | x1.x2, y1, y2, z1, z2 | UserA – FULL ACCESS UserB – FULL ACCESS UserC – LIMITED ACCESS | Alzheimer's Alliance |

1180
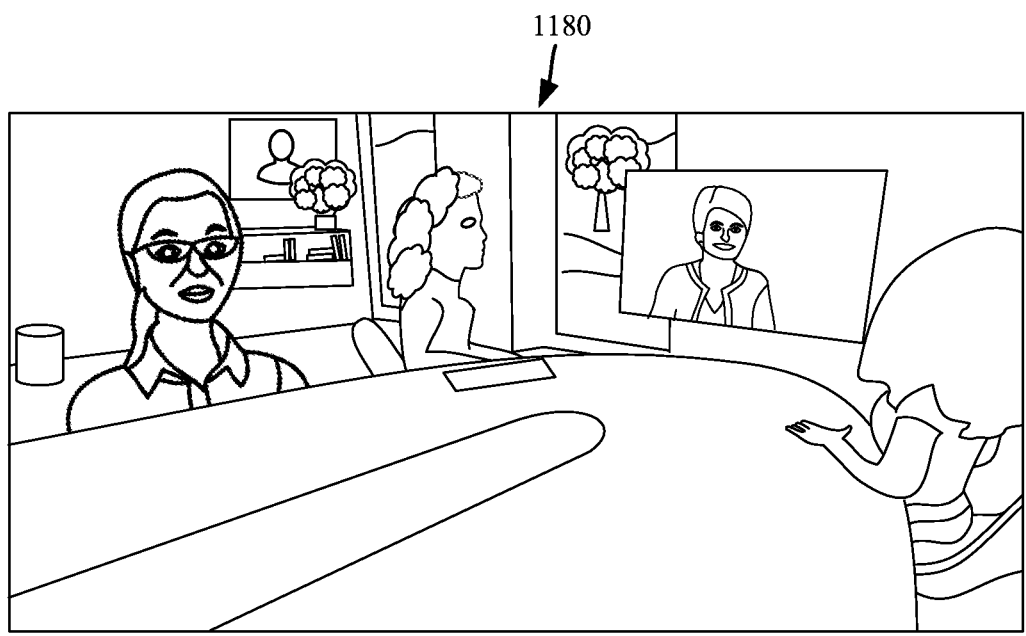
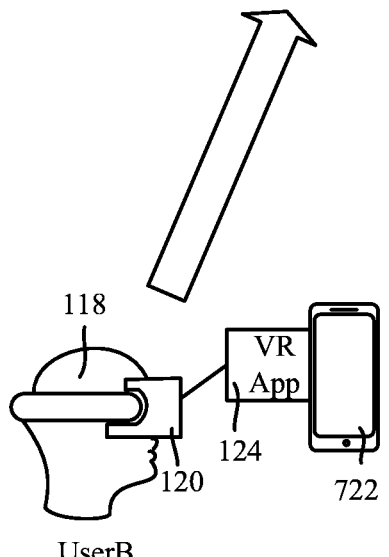
118
VR App
124
722
120
UserB
FIG. 11

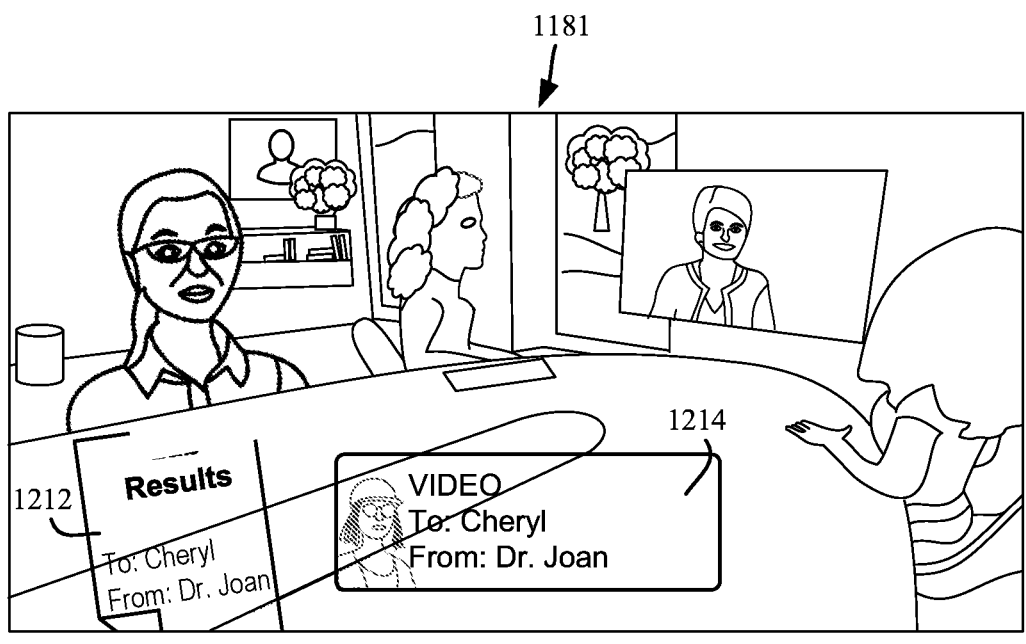
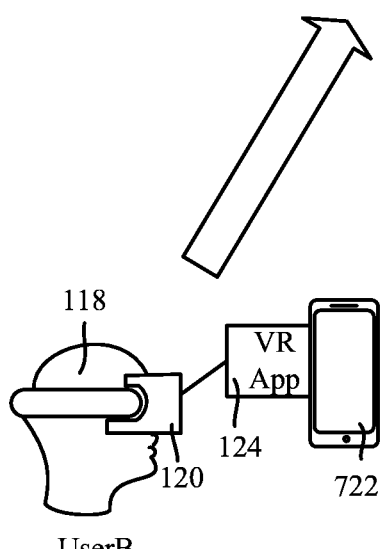
FIG. 12

FIG. 14

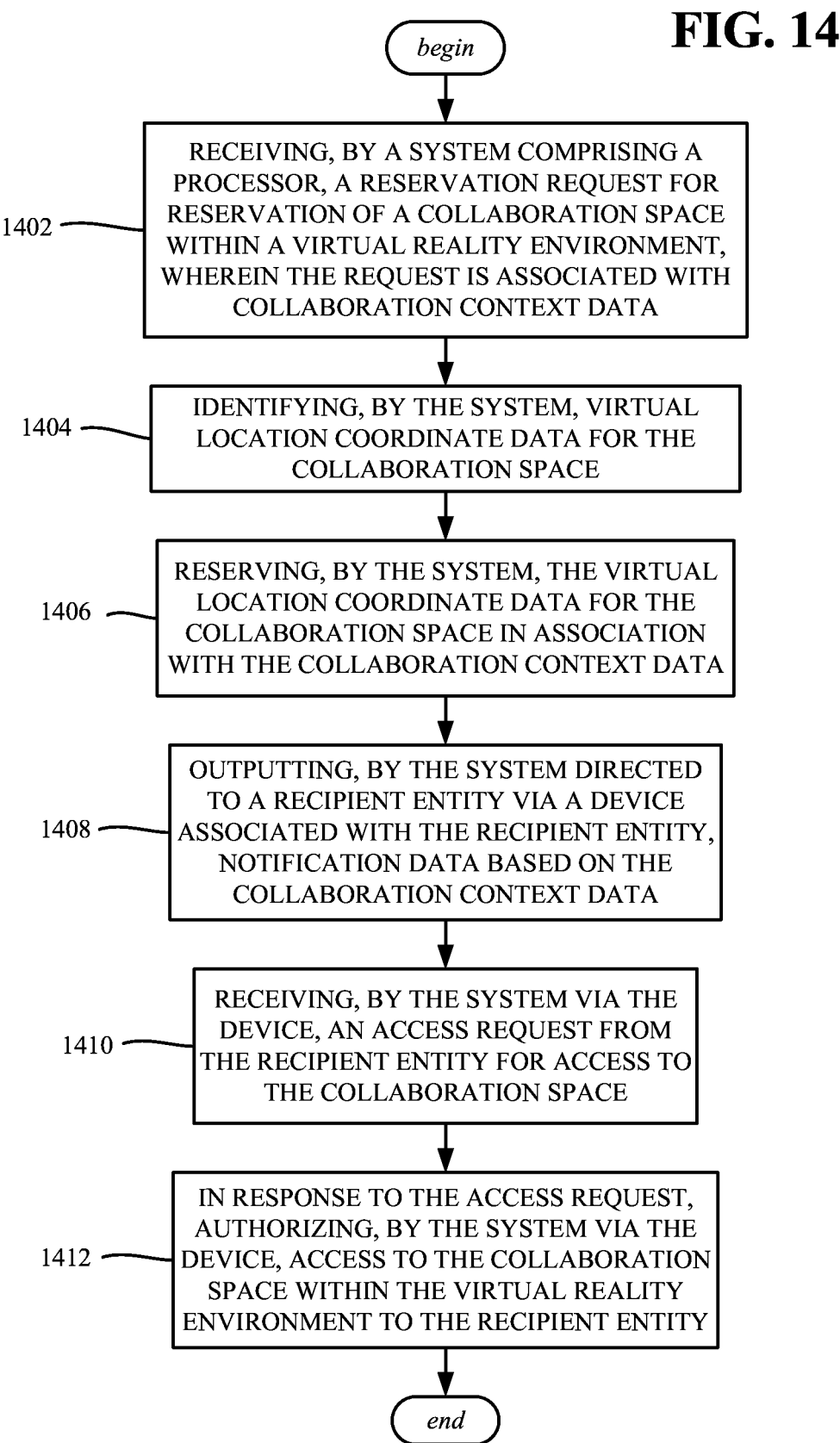

begin

1402 — RECEIVING, BY A SYSTEM COMPRISING A PROCESSOR, A RESERVATION REQUEST FOR RESERVATION OF A COLLABORATION SPACE WITHIN A VIRTUAL REALITY ENVIRONMENT, WHEREIN THE REQUEST IS ASSOCIATED WITH COLLABORATION CONTEXT DATA

1404 — IDENTIFYING, BY THE SYSTEM, VIRTUAL LOCATION COORDINATE DATA FOR THE COLLABORATION SPACE

1406 — RESERVING, BY THE SYSTEM, THE VIRTUAL LOCATION COORDINATE DATA FOR THE COLLABORATION SPACE IN ASSOCIATION WITH THE COLLABORATION CONTEXT DATA

1408 — OUTPUTTING, BY THE SYSTEM DIRECTED TO A RECIPIENT ENTITY VIA A DEVICE ASSOCIATED WITH THE RECIPIENT ENTITY, NOTIFICATION DATA BASED ON THE COLLABORATION CONTEXT DATA

1410 — RECEIVING, BY THE SYSTEM VIA THE DEVICE, AN ACCESS REQUEST FROM THE RECIPIENT ENTITY FOR ACCESS TO THE COLLABORATION SPACE

1412 — IN RESPONSE TO THE ACCESS REQUEST, AUTHORIZING, BY THE SYSTEM VIA THE DEVICE, ACCESS TO THE COLLABORATION SPACE WITHIN THE VIRTUAL REALITY ENVIRONMENT TO THE RECIPIENT ENTITY end

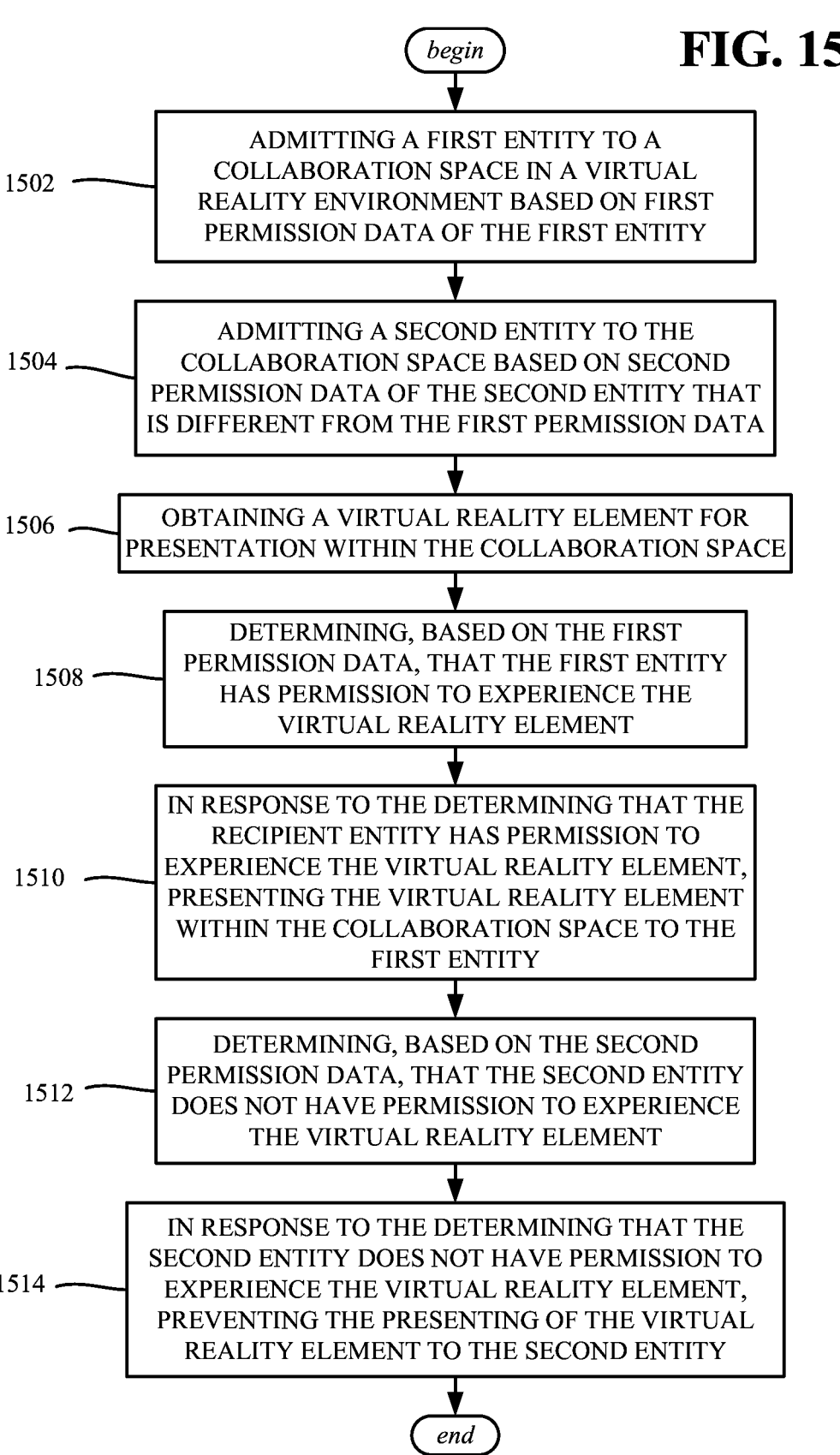

begin

FIG. 15

1502 — ADMITTING A FIRST ENTITY TO A COLLABORATION SPACE IN A VIRTUAL REALITY ENVIRONMENT BASED ON FIRST PERMISSION DATA OF THE FIRST ENTITY

1504 — ADMITTING A SECOND ENTITY TO THE COLLABORATION SPACE BASED ON SECOND PERMISSION DATA OF THE SECOND ENTITY THAT IS DIFFERENT FROM THE FIRST PERMISSION DATA

1506 — OBTAINING A VIRTUAL REALITY ELEMENT FOR PRESENTATION WITHIN THE COLLABORATION SPACE

1508 — DETERMINING, BASED ON THE FIRST PERMISSION DATA, THAT THE FIRST ENTITY HAS PERMISSION TO EXPERIENCE THE VIRTUAL REALITY ELEMENT

1510 — IN RESPONSE TO THE DETERMINING THAT THE RECIPIENT ENTITY HAS PERMISSION TO EXPERIENCE THE VIRTUAL REALITY ELEMENT, PRESENTING THE VIRTUAL REALITY ELEMENT WITHIN THE COLLABORATION SPACE TO THE FIRST ENTITY

1512 — DETERMINING, BASED ON THE SECOND PERMISSION DATA, THAT THE SECOND ENTITY DOES NOT HAVE PERMISSION TO EXPERIENCE THE VIRTUAL REALITY ELEMENT

1514 — IN RESPONSE TO THE DETERMINING THAT THE SECOND ENTITY DOES NOT HAVE PERMISSION TO EXPERIENCE THE VIRTUAL REALITY ELEMENT, PREVENTING THE PRESENTING OF THE VIRTUAL REALITY ELEMENT TO THE SECOND ENTITY end

1600

MOBILE HANDSET

APPLICATIONS — 1606

CLIENT (STORE, DISCOVERY, PLAY) — 1646

FIRMWARE — 1608

VIDEO COMP — 1630

TRIGGER COMPONENT — 1638

HYSTERESIS COMPONENT — 1636

DISPLAY — 1612

SIP CLIENT — 1640

CAMERA — 1622

SUBSCRIBER IDENTITY SYSTEM — 1618, 1620

COMMUNICATION COMPONENT — 1610

CELL TCVR — 1611

WIFI TCVR — 1613

SERIAL I/O INTERFACE — 1614

PROCESSOR — 1602

MEMORY — 1604

LOCATION COMPONENT — 1632

USER INPUT — 1635

AUDIO I/O — 1616

POWER SOURCE — 1624

POWER I/O — 1626

METAVERSE CONTEXTUAL COLLABORATION SPACES

TECHNICAL FIELD

The subject application relates to the virtual reality applications in general, and more particularly to collaborating via a virtual reality collaboration space, and related embodiments.

BACKGROUND

Virtual reality meetings are becoming more popular. A typical virtual reality meetings scenario is almost identical to an in-person meeting scenario, in which an organizer sets a start time and meeting duration, and specifically invites one or more other attendees; indeed, there can be a regular in-person meeting in which at least one invitee attends virtually. Such conventional meeting scenarios work well for many situations, but are not particular suited for other situations.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 11 is an example representation of a user's virtual reality view, in which the collaboration space exists indefinitely, in accordance with various aspects and embodiments of the subject disclosure.

FIG. 12 is an example representation of a second user's virtual reality view, in which the collaboration space can be used by a first user to transfer information to the second user, in accordance with various aspects and embodiments of the subject disclosure.

FIG. 14 is a flow diagram representing example operations related to reserving a collaboration space within a virtual reality environment and notifying an authorized recipient of the reserved collaboration space, in accordance with various aspects and embodiments of the subject disclosure.

FIG. 15 is a flow diagram representing example operations related to determining user permissions with respect to presenting (or not presenting) a virtual reality element for user experiences, in accordance with various aspects and embodiments of the subject disclosure.

DETAILED DESCRIPTION

Figure 1:
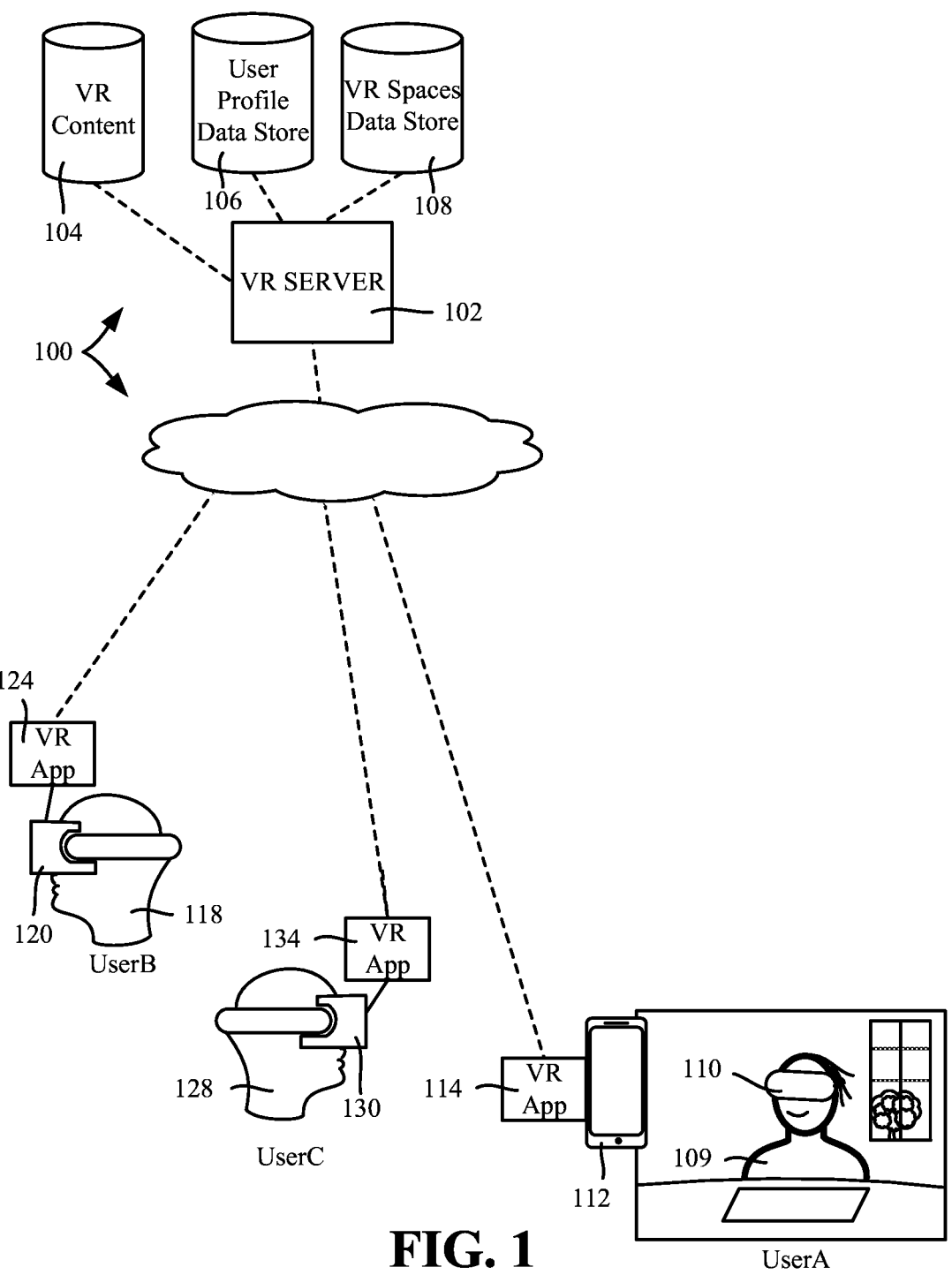
FIG. 1 is a block diagram of an example system/architecture for collaboration in a virtual reality environment, in accordance with various aspects and embodiments of the subject disclosure.

The technology described herein is generally directed towards virtual reality collaboration spaces, in which a user can switch from non-virtual reality mode to virtual reality mode working within the context associated with the collaboration space. A user (or process or the like) creates a virtual reality collaboration space that is associated with collaboration context data, e.g., a general theme/subject/topic/title. The creation of and attendance to a virtual reality collaboration space can be generally ad hoc for a specific context. Once created, a virtual reality collaboration space can be pervasively existent, such that the space can be joined or returned to as needed, at any time with any participants (even when no participants are currently participating). As such, collaborators may come and go from the space to collaborate as desired within the published context. Such nonlinear collaboration spaces do not require specifically timed meetings of fixed durations; further, specifically invited participants are not required, although limits can be placed on who can participate.

The existence of the virtual reality collaboration space, as associated with its collaboration context data, may be broadcast to other users, which, for example, may include specific invitees or general invitees. Other users may proactively search for such a relevant collaboration space based on the collaboration context data. Further, when a user is detected or has declared to be working within a context, a corresponding collaboration space can be automatically found for the user, to which the user can electively switch.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system/architecture 100 including a virtual reality (VR) server 102, which is coupled to a virtual reality content data store 104 to present virtual environments to participating users, that is, the content data store 104 specifies data to create a virtual reality environment that users can experience together. Such virtual reality content may create any of a number of different types of experiences for the users, although generally as described herein a virtual reality collaboration space is one such virtual reality experience that is created. As further described herein, the virtual reality collaboration spaces are based on information accessible to the virtual reality server 102. In one implementation, this is accomplished via the virtual reality server 102, which has read and write access from and to a user profiles data store (e.g., database) 106 and a virtual reality spaces data store (e.g., database) 108.

Any number of users can participate in a virtual reality collaboration space; three such users 109, 118 and 128 (UserA, UserB, and UserC, respectively) are depicted in the example of FIG. 1. The users 109, 118 and 128 are with equipped with virtual reality devices 110, 120 and 130 (e.g., a virtual reality viewer and audio capabilities, such as ear phones), respectively, with respective virtual reality application programs (VR Apps) 114, 124 and 134 coupled to or incorporated into the respective virtual reality devices 110, 120 and 130). Note that in this example, at least one user (the UserA 109) has a smart device 112 (e.g., a smart phone) that facilitates various interfacing functionality, (although the virtual reality application program 114 may perform some or all of the interfacing functionality, (e.g., setting up a virtual reality collaboration space) as described in the examples herein).

A user (e.g., the UserA 109) may enter a work mode. Work mode entry may be detected (e.g., by a system, program, artificial intelligence or the like), or explicitly declared by the user in some way. For example, detection of work mode entry may include detecting a user logging in to a device or an application program, specific use of the device or application program, detecting information from biometric or location sensors, or from other sensor data such as motion detectors, cameras, microphones, or still others. Declaration of work mode entry may be made by a user such as via speech, or other data input on a device that is owned and controlled by the user or a nearby shared device, such as a microphone or other. Note that while a work mode is used as an example, collaboration for any purpose can benefit from this technology, e.g., social collaboration (a social collaboration space where admitted users such as hobbyists can collaborate with others socially whenever desired, a group of gamers collaborating on an ad hoc basis to defeat a video game) and the like.

Figure 2:
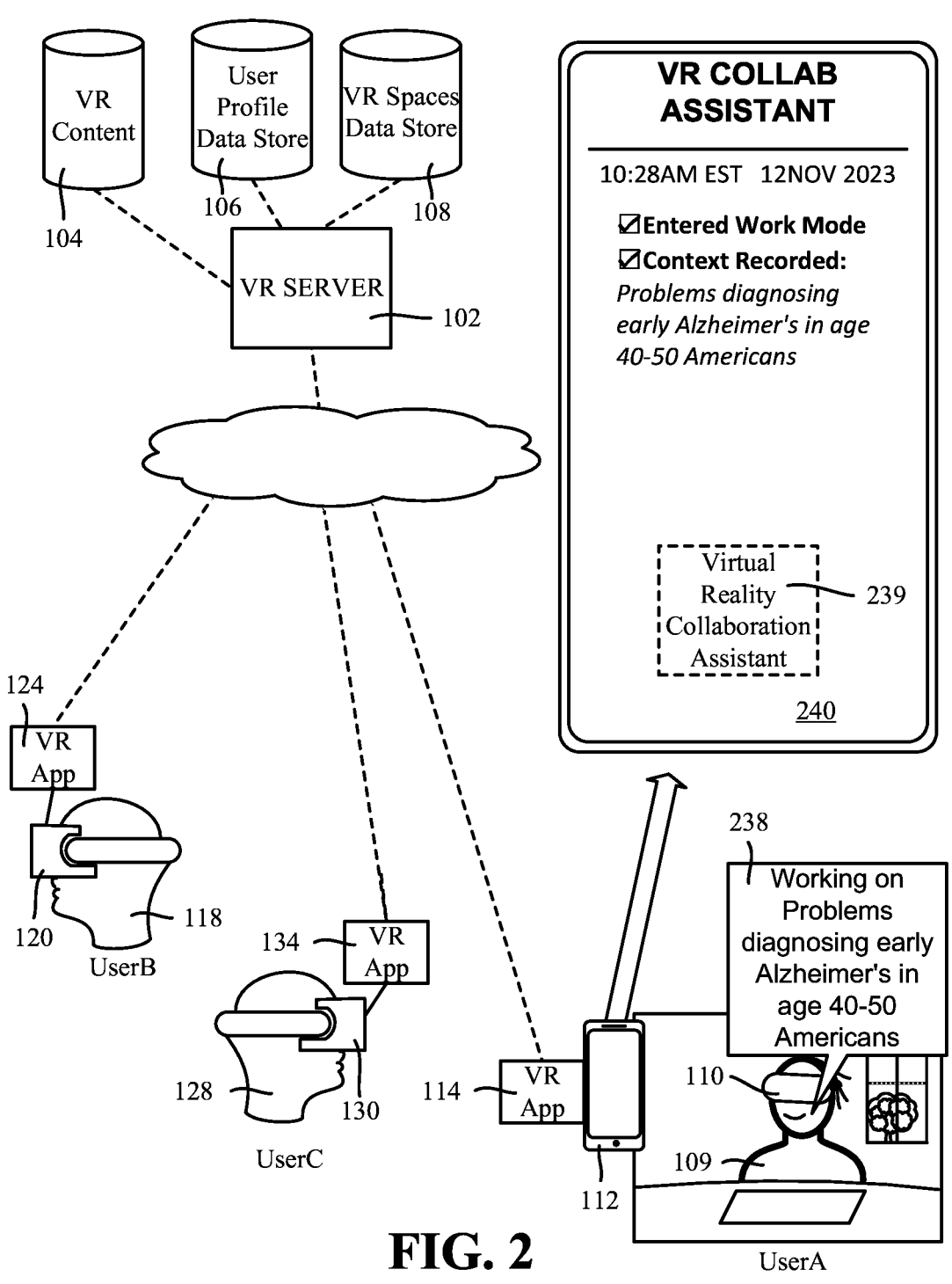
FIG. 2 is a block diagram of an example system/architecture, including an example interactive interface by which a user initiates the creation of a virtual reality collaboration space associated with collaboration context data, in accordance with various aspects and embodiments of the subject disclosure.

In the example depicted at block 238 of FIG. 2, such work mode entry is made by the UserA 109 via speech. When this occurs, a virtual reality collaboration assistant, e.g., a program 239 as displayed via the example interactive interface 240, operates to establish and record relevant context data, e.g., as extracted from the speech.

Figure 3:
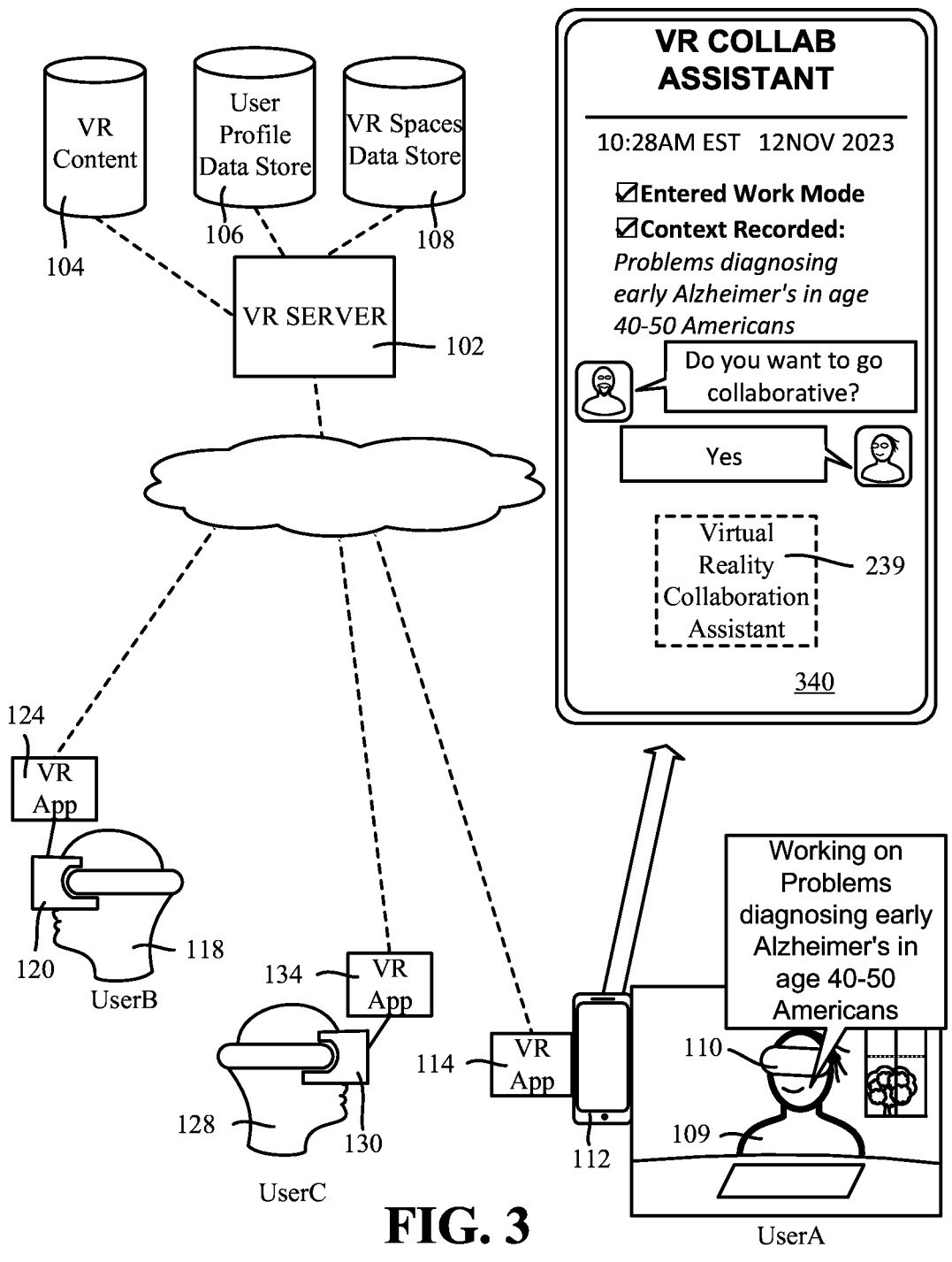
FIG. 3 is a block diagram of an example system/architecture, including an example interactive interface by which users enter a virtual reality collaboration mode, in accordance with various aspects and embodiments of the subject disclosure.

The UserA 109 may further specify that he or she wishes to enter a collaboration mode with one or more other users, e.g., as displayed in FIG. 3 via the updated example interactive interface 340. The intent may be to collaborate with known other users, and/or unknown other users. In general, the collaboration is specific to the context recorded, shown as "Problems diagnosing early Alzheimer's in age 40-50 Americans" in this example. The virtual reality collaboration assistant may invoke the virtual reality application program 114 for UserA 109 and establish (reserve) a virtual reality collaboration space with the virtual reality server 102. Whether manually initiated or done automatically on behalf of the user, the context data can be associated with the request to reserve the collaboration space, as described herein. Note that it is feasible to reserve a collaboration space starting in the future, e.g., advertised as "starting August 15th we will be collaborating on project X, so get your ideas together" so that users do not join prematurely and give up or become confused because the purpose and/or materials for collaborating are not yet ready.

Figure 4:
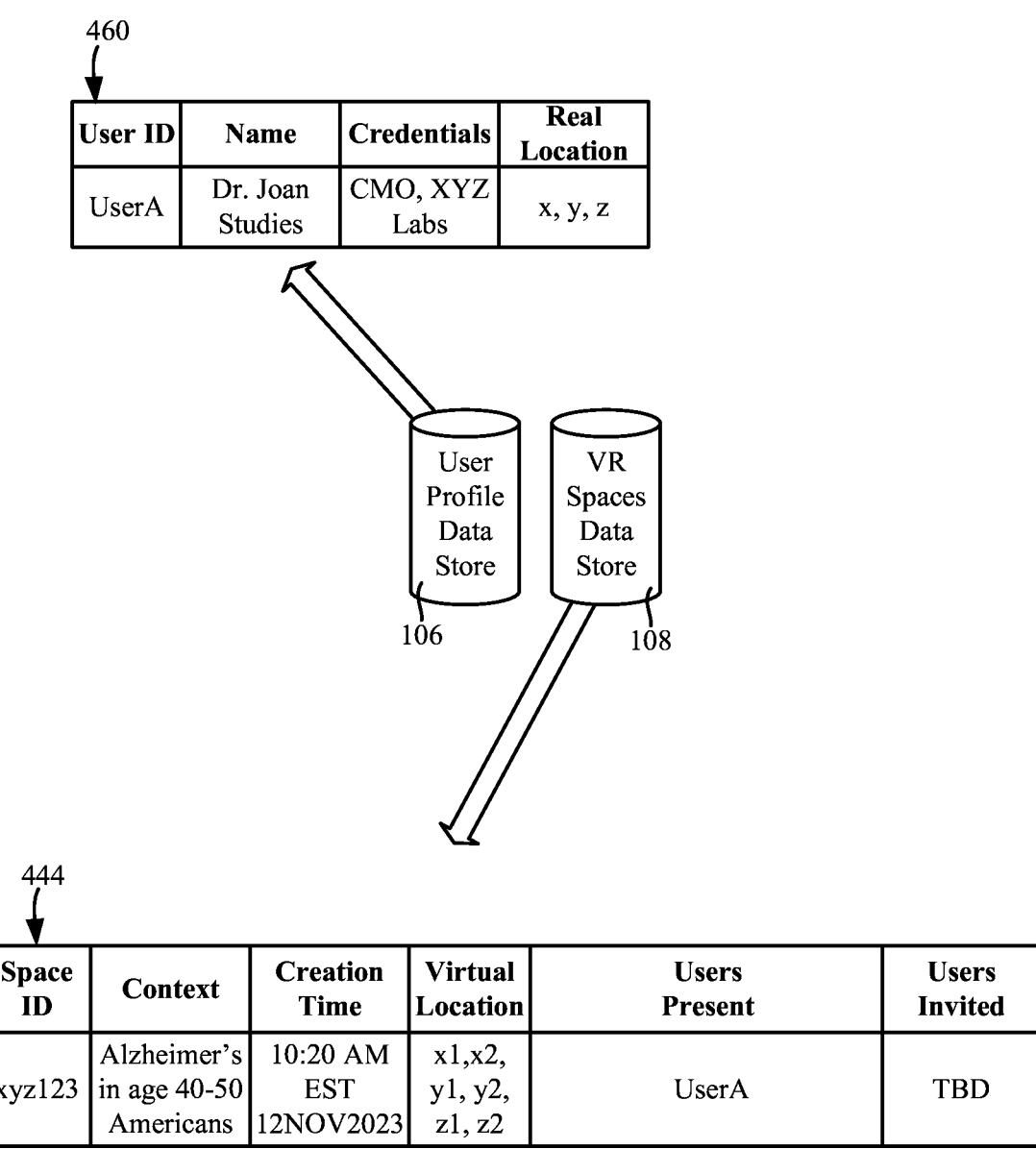
FIG. 4 is an example representation of example data structures relating to user profile data, and to a virtual reality collaboration space, in accordance with various aspects and embodiments of the subject disclosure.

To establish and reserve the virtual reality collaboration space, a record or other like entry may be made in the virtual reality spaces data store 108 to include relevant information, such as shown in the example data structure 444 of FIG. 4. Example information recorded can include a space ID, context for the space, time data, virtual location (e.g., coordinate) data, and the identities of users present in the virtual reality collaboration space. The virtual location data/virtual reality collaboration space in general is unique within the system 100 (FIG. 1), because, for example, the virtual reality collaboration space can exist indefinitely, whereby no other virtual space can use the same virtual location data space while the reserved collaboration space exists. Any suitable way to define a virtual location data of a virtual space can be used, e.g., a range of coordinates that define a polyhedral volume (such as shown in FIG. 4), or coordinate point data along with height, width and length radii, and so forth.

Further, the user profile data that is stored in the user profile data store 106 may be accessed to associate the example record 444 with the user information in the example data structure 460. In this way, for example, a user identifier, the user's actual name, credentials, and the real location of the user (if needed, such as for determining work mode entry) can be maintained. For example, as described herein the initiating user's name and credentials can be associated with the virtual reality collaboration space, so that, for example, other users may decide whether or not to join the collaboration.

Figure 5:
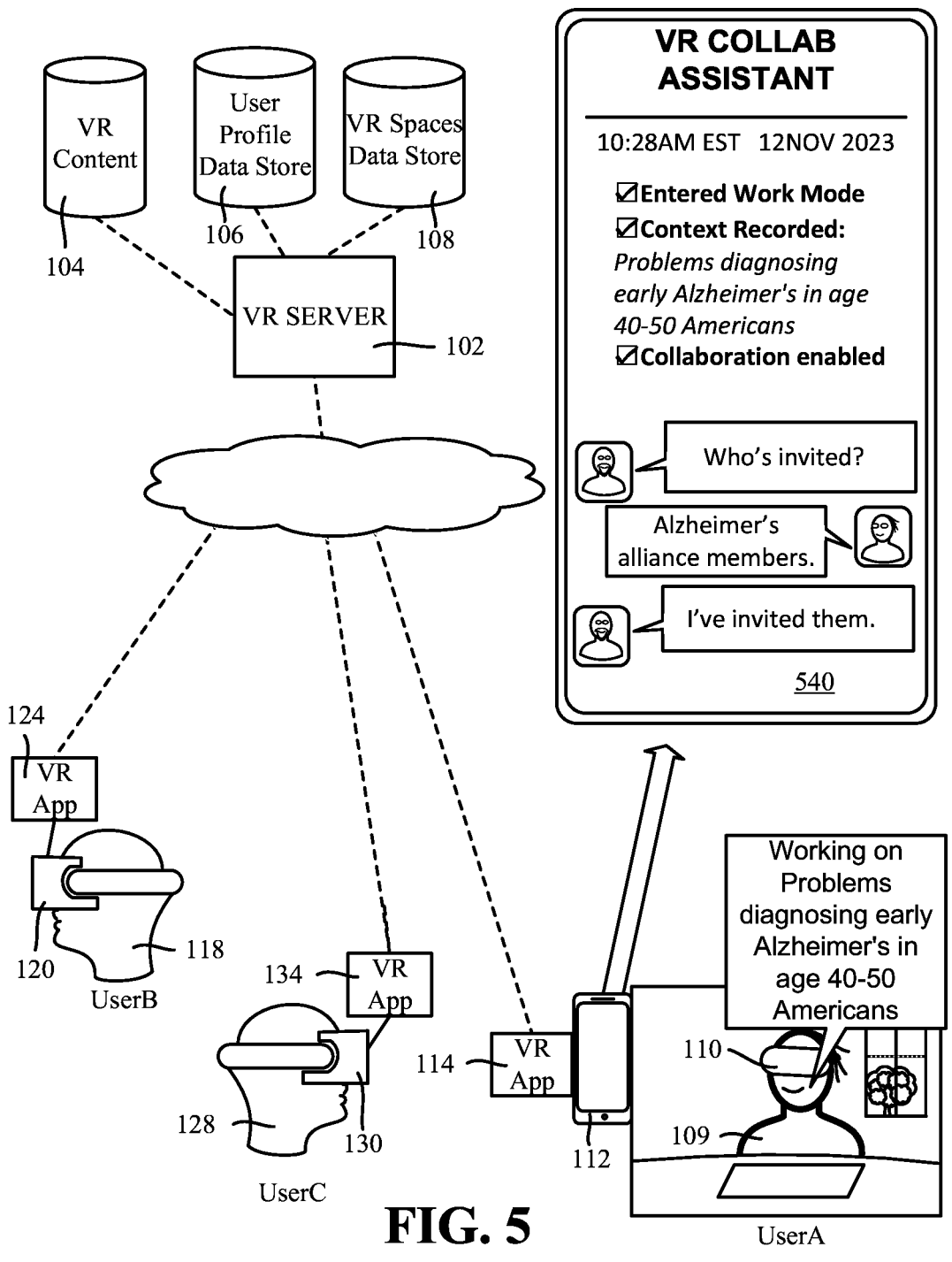
FIG. 5 is a block diagram of an example system/architecture, including an example interactive interface by which a user publishes the existence of a virtual reality collaboration space to invited user(s), in accordance with various aspects and embodiments of the subject disclosure.
Figure 6:
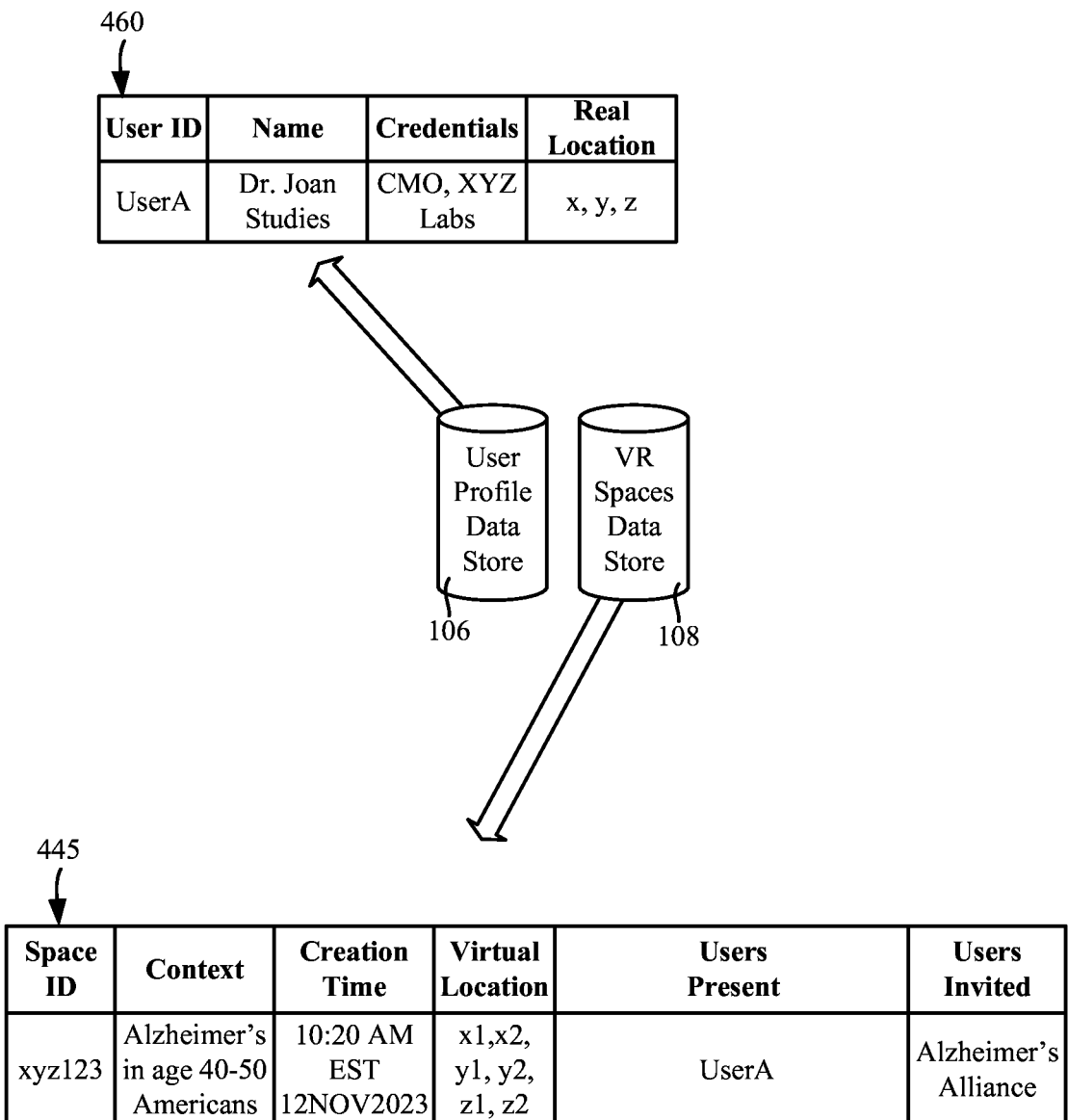
FIG. 6 is an example representation of example data structures relating to a user profile data, and to a virtual reality collaboration space in which users have been invited, in accordance with various aspects and embodiments of the subject disclosure.

With respect to publishing the space for collaboration, (e.g., as displayed in FIG. 5 via the updated example interactive interface 540), the UserA 109 may be prompted by the virtual reality collaboration assistant to specify (or may otherwise specify) one or more other users who have access to the space. The collaboration assistant may, for example, explicitly invite users that are specified by sending invitations to any users designated within an invitation list as belonging according to their user profile data, and/or the space may be identified within the virtual reality spaces database as being accessible by one or more users whose profiles indicate permissions that are consistent with the invitation list. In any event, the space created is now searchable and accessible within the virtual reality spaces data store 108 to users with permission to access the virtual reality spaces data store 108. Further, as shown in FIG. 6, once one or more users are (or a group is) invited, the data structure 444 is modified into an updated data structure 445 to maintain information as to the invited user(s) or group. It is also feasible to grant permission to a non-human entity to access a virtual reality collaboration space, e.g., a recording device, a communications device, a machine-learning device, a robot, and so forth.

In one embodiment, an alert or notification may be sent to other users who have permission to access the collaboration space. These alerts may appear as shown on a device, such as in the example user interface 770 of FIG. 7, for example, and/or other users' devices or as virtual reality alerts if they are in a virtual reality session elsewhere. For example, the UserA 109 may use a settings option once he or she is in the virtual reality space to post messages to other users who may receive these modifications. For example, the UserA 109 may post an advertisement (e.g., send a message or otherwise publish) to other users such as a personal invitation, and/or provide notice as to how long he or she expects to be present in the collaboration space. Such messages may be presented within the notification to the other users as in the example user interface 770 shown in FIG. 7. Alternatively, other users may discover the newly created virtual reality collaboration space through a search engine or the like that has access to the virtual reality spaces database. It is also feasible to advertise a collaboration space in other ways, e.g., to a website or the like for anyone who has access to the internet, or some subset of possible users, with the website or the like having permission data for privately linking to the virtual reality spaces data store 108. In this way, not everyone needs to have permission to access the virtual reality spaces data store 108 to search for and gain access to such "more public" collaboration spaces.

Figure 7:
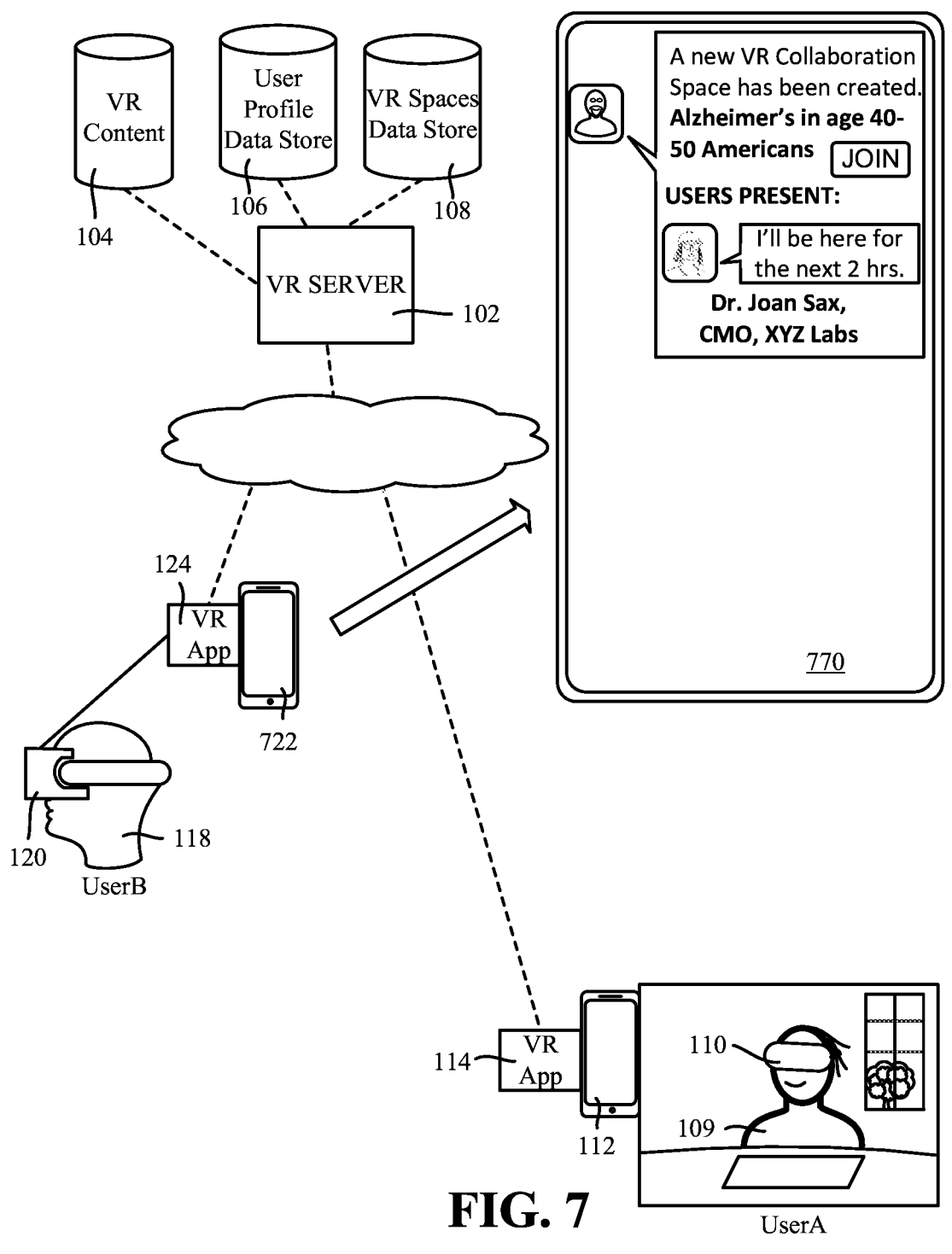
FIG. 7 is a block diagram of an example system/architecture, including an example interactive interface by which a user is notified of virtual reality collaboration space's existence, in accordance with various aspects and embodiments of the subject disclosure.

Further, there can be a replay of recorded prior collaboration space activity. For example, consider that a user wishes to attend the collaboration during the time that the doctor ("Dr. Joan Sax") shown in the example user interface 770 of FIG. 7 is to be present. However, that user has a conflict and cannot enter the collaboration space at that time, and thus may wish to replay what was discussed at that time. It is also feasible for the server 102 to identify keywords and the like during earlier collaboration activities and replay the part or parts relevant to the keywords, possibly, but not necessarily, within a user-specified timeframe (e.g., "did anything relevant occur today?"). Fast-forward and/or skipping (which can be interactive, or automated based on who was present, what was said and so on), pause and rewind can be provided.

Figure 8:
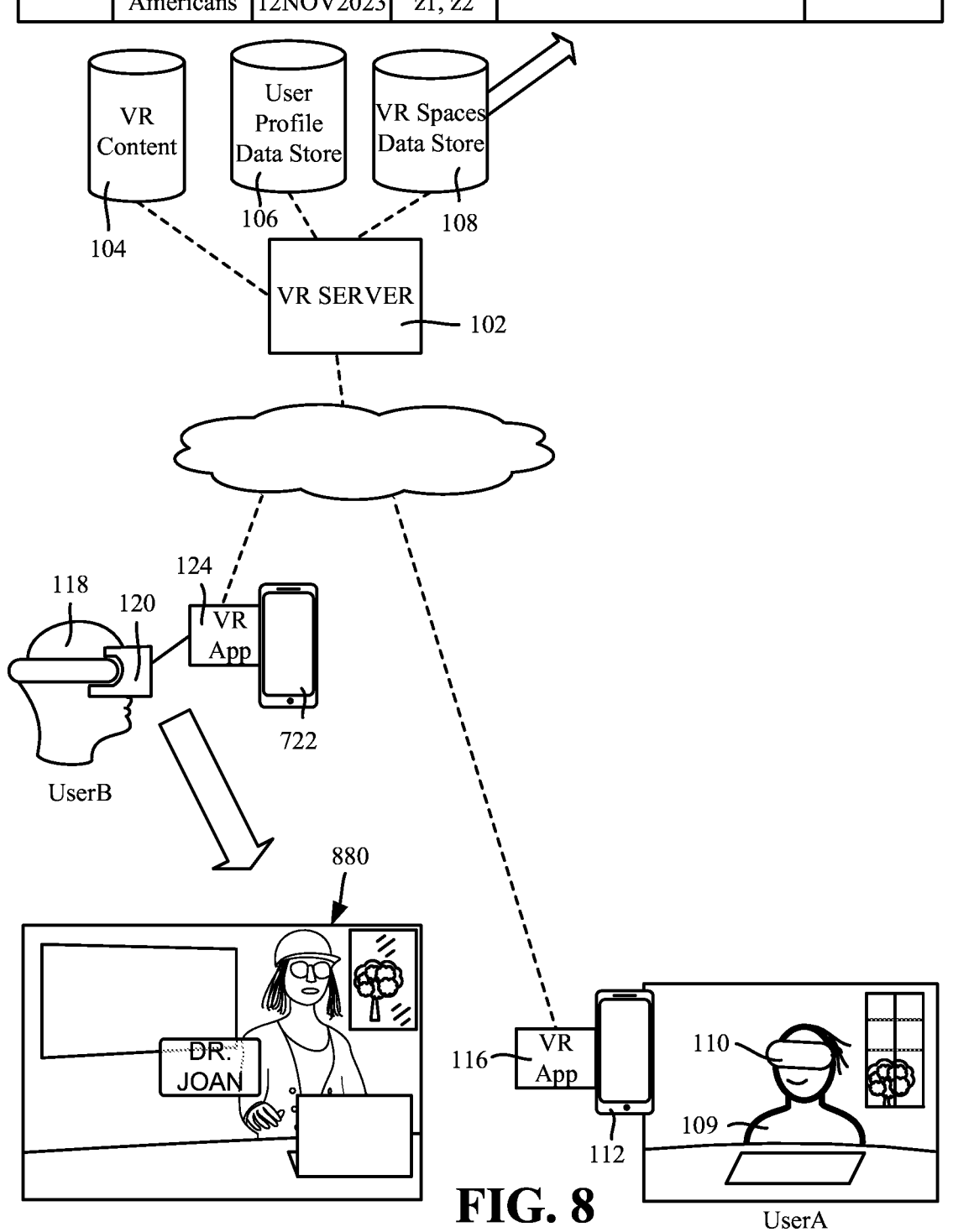
FIG. 8 is a block diagram of an example system/architecture, including an example representation of a collaborator-admitted user's virtual reality view, in accordance with various aspects and embodiments of the subject disclosure.

In the example shown in FIG. 8, the UserB 118 has elected to join the virtual reality collaboration space. In the example of FIG. 8, the collaboration space from the perspective of the UserB 118 is represented as the view 880. Upon joining, the virtual reality server 102 confirms the UserB's admission permission via the user's user profile data, and, upon confirmation, admits the UserB 118 to the virtual reality collaboration space.

Further, the virtual reality spaces database is updated (e.g., shown in the record 446) to show UserB as currently present in the space. As part of the UserB 118 being admitted to the collaboration space, virtual reality content representative is presented based on the virtual location coordinates that are reserved in the virtual reality spaces data store 108 for the collaboration space.

Figure 9:
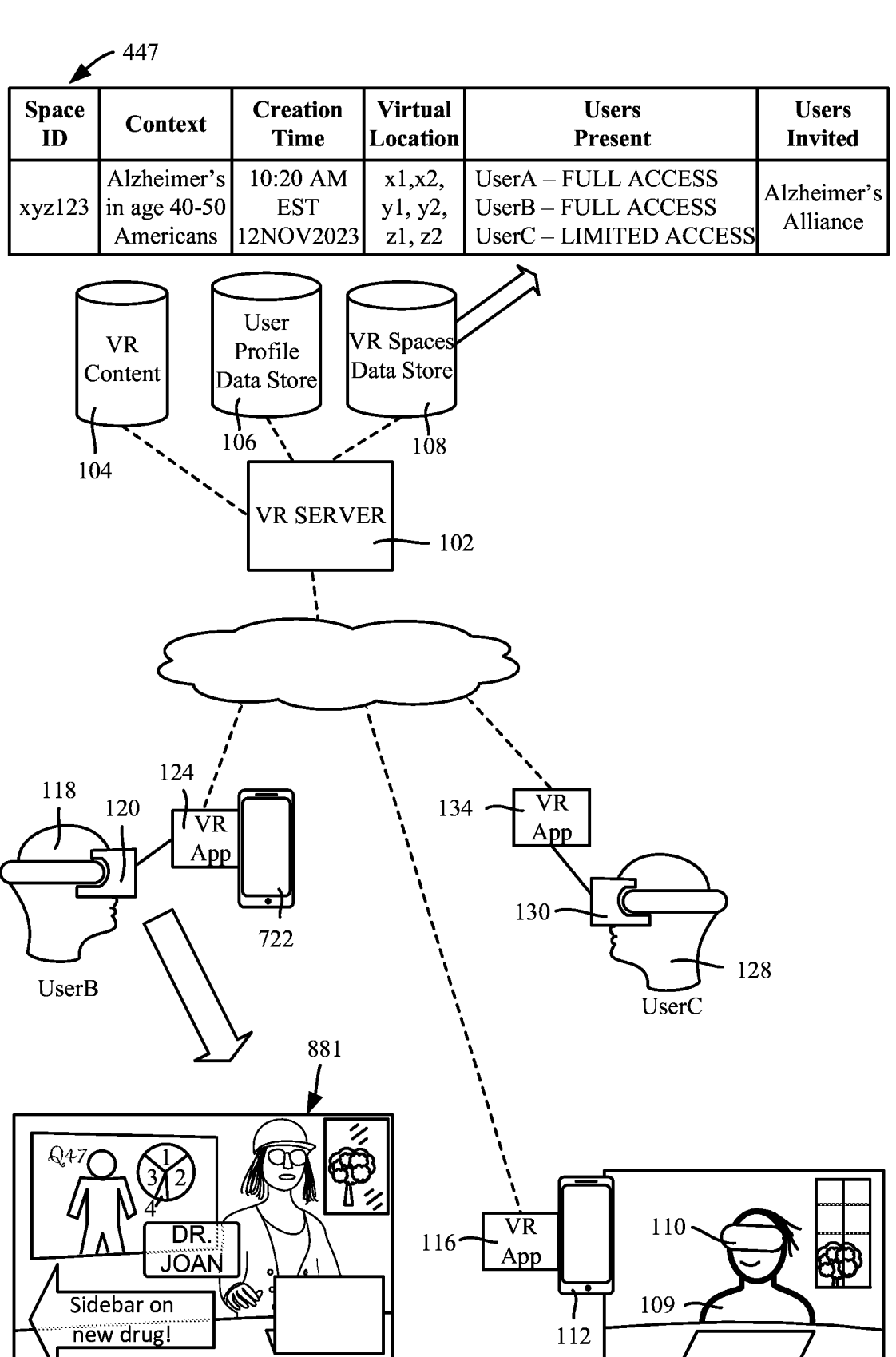
FIG. 9 is a block diagram of an example system/architecture, including an example representation of a user's virtual reality view, in which the user is permitted to access and/or view controlled virtual data element(s), in accordance with various aspects and embodiments of the subject disclosure.

In other embodiments, admission to the reserved collaboration space may be open to anyone, or some broad range of invitees. In such cases or in other situations, users may be admitted but with differing levels of permissions, e.g., in terms of access to the collaboration space and/or access to content within the collaboration space. As shown in FIG. 9 via the updated data structure 447, each user's level of permissions within a given collaboration space may be stored within the virtual reality spaces data store 108. For example, the UserC 128 has limited access. Note that there may be more granular levels of access (e.g., ranging from one to ten) for the different users' permission level and virtual elements' permission levels, or otherwise defined levels, e.g., full, limited view access, limited materials access, and/or the like.

Over time, other collaborators may come and go from the space. Users that are not preapproved for admission may need to accept one or more limitations to gain access, as admitted by the virtual reality server 102, to the space. For instance, the virtual reality server 102 may present to a user to execute a nondisclosure agreement, intellectual property agreement, or other such limitation data prior to admission. Some level of authentication or verification may be needed to prevent a fraudulent user from gaining admittance by simply accepting such a limitation under false pretenses.

As also shown in FIG. 9 as an example of permission data, the UserB 118 has full access permission. Therefore, the UserB 118 may have full view access to any virtual data elements presentable in the virtual reality space, e.g., shown via the updated view 881. This may include proprietary (permission-controlled) virtual data elements such as names of participants, directional navigation, content, audio, and other elements (e.g., whiteboard notations). The virtual reality server 102 manages this presentation by assigning a permission access level to each controlled data element that is used in the generation of the virtual reality space that is created. There needs to be a match (or the user's permission needs to be equal or greater when comparing to a data element's permission level) between the permission level of a user and permission level needed to access each of the controlled virtual reality elements in order for that user to experience (e.g., view) the permission-controlled data element. In the example of FIG. 9, the UserB 118 experiences the presentation such as shown in the view 881, with some whiteboard content elements, a name ("Dr. Joan") label element, and an interactive link to a sidebar element.

Figure 10:
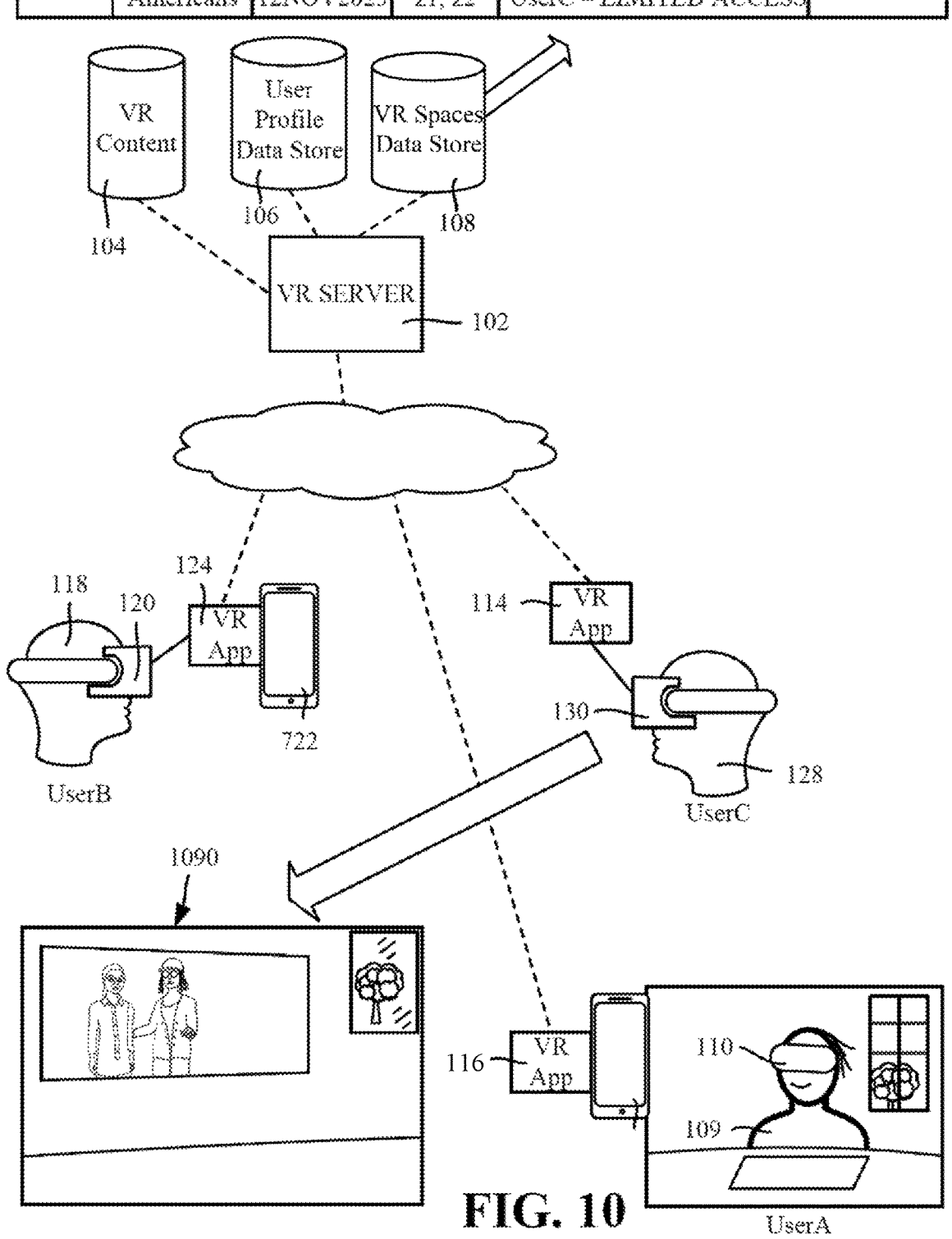
FIG. 10 is a block diagram of an example system/architecture, including an example representation of another user's virtual reality view, in which the other user is not permitted to access and/or view controlled data element(s), in accordance with various aspects and embodiments of the subject disclosure.

In contrast, as shown in FIG. 10, the UserC 128 has limited access permissions, and thus experiences a different virtual reality presentation, with only access to virtual elements that are permitted for such a limited access user. In this example, the view 1090 of the UserC 128 does not see attachment content, whiteboard content, and so forth. The overall view of the UserC 128 is also different, e.g., zoomed out relative to the view 881 in FIG. 8.

As set forth herein, unlike a meeting, the collaboration space does not exist for a fixed amount of time and may continue to exist pervasively even when no one is virtually present. Instead, the collaboration space exists as a reserved set a virtual location coordinates within virtual reality space and may be returned to at any time by anyone with proper access permissions. Thus, in the example view 1180 of FIG. 11, any user who is able to be admitted can come and go whenever desired because of the collaboration space's pervasive existence. Note, however that when appropriate, a user with appropriate credentials (e.g., the user initiator who created the collaboration space) can end the space's existence, such as to conserve computing resources, avoid being contacted by other means (e.g., calls or emails) from users with questions or the like, avoid being associated with a collaboration space that is obsolete, no longer relevant or presented bad data, and so on. It is also feasible to automatically set a time to expire a space's existence, e.g., one year from the time of creation, unless explicitly extended.

Because the existence of the collaboration space generally remains pervasive over time (that is, unless intentionally ended), the collaboration space may be used as a secure drop off location for the exchange of information from one user to another. For example, consider that the UserB 118 may have left the space after the time depicted in FIG. 11 and re-entered it at a later time. When she reenters, as depicted in FIG. 12, another user has dropped of information, such as materials, a message or other information for the UserB 118. Note that there may not be any other users virtually present at the time the UserB 118 has reentered.

For example, as shown in the updated view 1181 of FIG. 12, UserA 109 may have dropped off virtual reality element(s) for the UserB 118. The UserA 109 may have specified that permission to access the information provided by UserA 109 is only available for the UserB 118. Therefore, the elements left for the UserB 118 (a link to an electronic document 1212 and a link to a video 1214 are shown in the example of FIG. 12) are only visible to, and accessible by, the UserB 118, regardless of who else is present. It is also feasible to leave virtual reality element(s) for a user group, e.g. only for an identified subgroup (such as an "employee" subgroup) among the full set of possible invitees (e.g., employees and company vendors).

One or more example aspects are represented in FIG. 12, and can correspond to a system, including a processor, and a memory that stores executable instructions that, when executed by the processor, facilitate performance of operations. Example operation 1202 represents receiving a reservation request for reservation of a collaboration space within a virtual reality environment. Example operation 1204 represents, in response to the reservation request, identifying a virtual location within the virtual reality environment for the collaboration space. Example operation 1206 represents receiving an access request, via a device, of a requesting entity authorized to access the collaboration space. Example operation 1208 represents, in response to the access request, enabling access for the requesting entity to the collaboration space within the virtual reality environment.

The virtual location for the collaboration space can include virtual coordinates.

The reservation request can be associated with collaboration context data associated with collaboration context data applicable to the collaboration space. Further operations can include sending a notification, based on the collaboration context data, to the requesting entity. Further operations can include advertising a searchable reference to the collaboration space based on the collaboration context data.

Further operations can include determining that the requesting entity is authorized to access the collaboration space, comprising evaluating permission data associated with the requesting entity. Presentation of a virtual reality element within the collaboration space to the requesting entity can be dependent on the permission data associated with the requesting entity.

Further operations can include determining that the requesting entity is not authorized for admission to the collaboration space without accepting limitation data, offering the limitation data to the requesting entity, and receiving acceptance of the limitation data from the requesting entity.

The access request can be a first access request, the requesting entity can be a first requesting entity associated with first permission data, and further operations can include receiving a second access request via a device of a second requesting entity authorized to access the collaboration space; the second requesting entity can be associated with second permission data that is different from the first permission data.

Further operations can include presenting, based on the first permission data, a virtual reality element to the first requesting entity, and not presenting, based on the second permission data, the virtual reality element to the second requesting entity.

Receiving the access request, via the device, of the requesting entity can include receiving the access request, via a first device, determined to be associated with a first user; further operations can include communicating, via the collaboration space, a message, via a second device, determined to be associated with a second user and determined to be authorized to access to the collaboration space.

Receiving the reservation request for the reservation of the collaboration space can include detecting an action by a reserving entity.

The collaboration space can be associated with collaboration context data associated with collaboration context data applicable to the collaboration space, and an environment of the collaboration space can be based on the collaboration context data.

Figure 13:
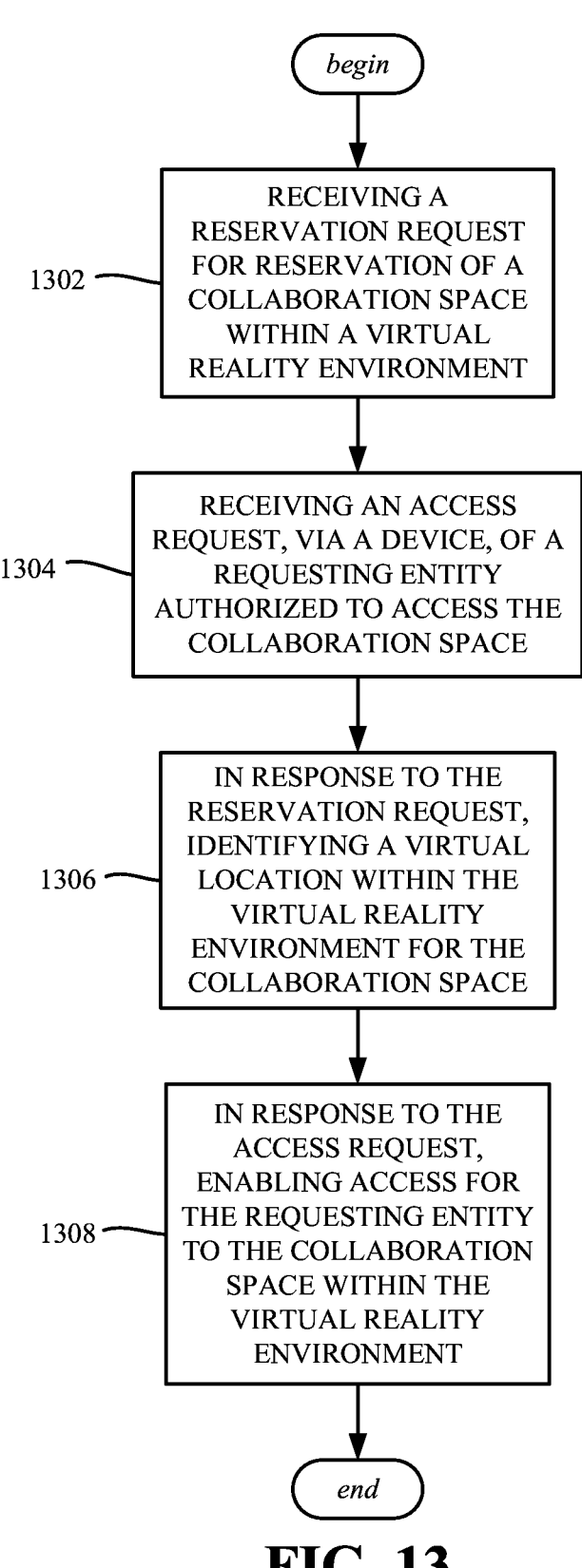
FIG. 13 is a flow diagram representing example operations related to reserving a virtual reality collaboration space within a virtual reality environment and enabling access to the collaboration space, in accordance with various aspects and embodiments of the subject disclosure.

One or more example aspects are represented in FIG. 13, and, for example, can correspond to operations, such as of a method. Example operation 1302 represents receiving, by a system comprising a processor, a reservation request for reservation of a collaboration space within a virtual reality environment, wherein the request is associated with collaboration context data. Example operation 1304 represents identifying, by the system, virtual location coordinate data for the collaboration space. Example operation 1306 represents reserving, by the system, the virtual location coordinate data for the collaboration space in association with the collaboration context data. Example operation 1308 represents outputting, by the system directed to a recipient entity via a device associated with the recipient entity, notification data based on the collaboration context data. Example operation 1310 represents receiving, by the system via the device, an access request from the recipient entity for access to the collaboration space. Example operation 1312 represents in response to the access request, authorizing, by the system via the device, access to the collaboration space within the virtual reality environment to the recipient entity.

Further operations can include, prior to the outputting the notification data, determining, by the system, that the recipient entity has permission to access the collaboration space.

Further operations can include, prior to the authorizing the access to the recipient entity, determining, by the system, that the recipient entity has permission to access the collaboration space.

Further operations can include obtaining, by the system, a virtual reality element for presentation within the collaboration space, determining, by the system, whether the recipient entity has permission to experience the virtual reality element, in response to determining that the recipient entity has permission to experience the virtual reality element, presenting, by the system, the virtual reality element within the collaboration space to the recipient entity, and in response to determining that the recipient entity does not have permission to experience the virtual reality element, preventing, by the system, the presenting of the virtual reality element within the collaboration space to the recipient entity.

One or more aspects are represented in FIG. 14, such as implemented in a machine-readable medium, including executable instructions that, when executed by a processor, facilitate performance of operations. Example operation 1402 represents admitting a first entity to a collaboration space in a virtual reality environment based on first permission data of the first entity. Example operation 1404 represents admitting a second entity to the collaboration space based on second permission data of the second entity that is different from the first permission data. Example operation 1406 represents obtaining a virtual reality element for presentation within the collaboration space. Example operation 1408 represents determining, based on the first permission data, that the first entity has permission to experience the virtual reality element. Example operation 1410 represents in response to the determining that the recipient entity has permission to experience the virtual reality element, presenting the virtual reality element within the collaboration space to the first entity. Example operation 1412 represents determining, based on the second permission data, that the second entity does not have permission to experience the virtual reality element. Example operation 1414 represents, in response to the determining that the second entity does not have permission to experience the virtual reality element, preventing the presenting of the virtual reality element to the second entity.

Further operations can include admitting a third entity to the collaboration space based on third permission data of the third entity that is different from the first permission data and the second permission data, obtaining a second virtual reality element for presentation within the collaboration space, determining, based on the first permission data, that the first entity has permission to experience the second virtual reality element, in response to the determining that the first entity has permission to experience the second virtual reality element, presenting the second virtual reality element within the collaboration space to the first entity, determining, based on the second permission data, that the second entity has permission to experience the second virtual reality element, in response to the determining that the second entity has permission to experience the second virtual reality element, presenting the second virtual reality element within the collaboration space to the second entity, determining, based on the third permission data, that the third entity does not have permission to experience the second virtual reality element, and in response to the determining that the third recipient entity does not have permission to experience the second virtual reality element, preventing the presenting of the second virtual reality element to the third entity.

Further operations can include maintaining data representing the collaboration space in association with collaboration context data applicable to the collaboration space.

As can be seen, the technology described herein facilitates the establishment of ad hoc collaboration spaces related to specific contexts in a convenient way. The collaboration spaces in association with their respective context data may be advertised (published and/or otherwise made available) to other users to find and join. Collaboration spaces can be pervasively existent, can be created and (once created) joined, left and returned to as needed at any time by any admitted participants. Such nonlinear collaboration spaces are in contrast to specifically timed/scheduled meetings of fixed durations and specifically invited participants.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Referring now to FIG. 15, illustrated is a schematic block diagram of an example end-user device (such as user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
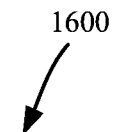
FIG. 16 illustrates an example block diagram of an example mobile handset operable to engage in a system architecture that facilitates wireless communications according to one or more embodiments described herein.
Figure 17:
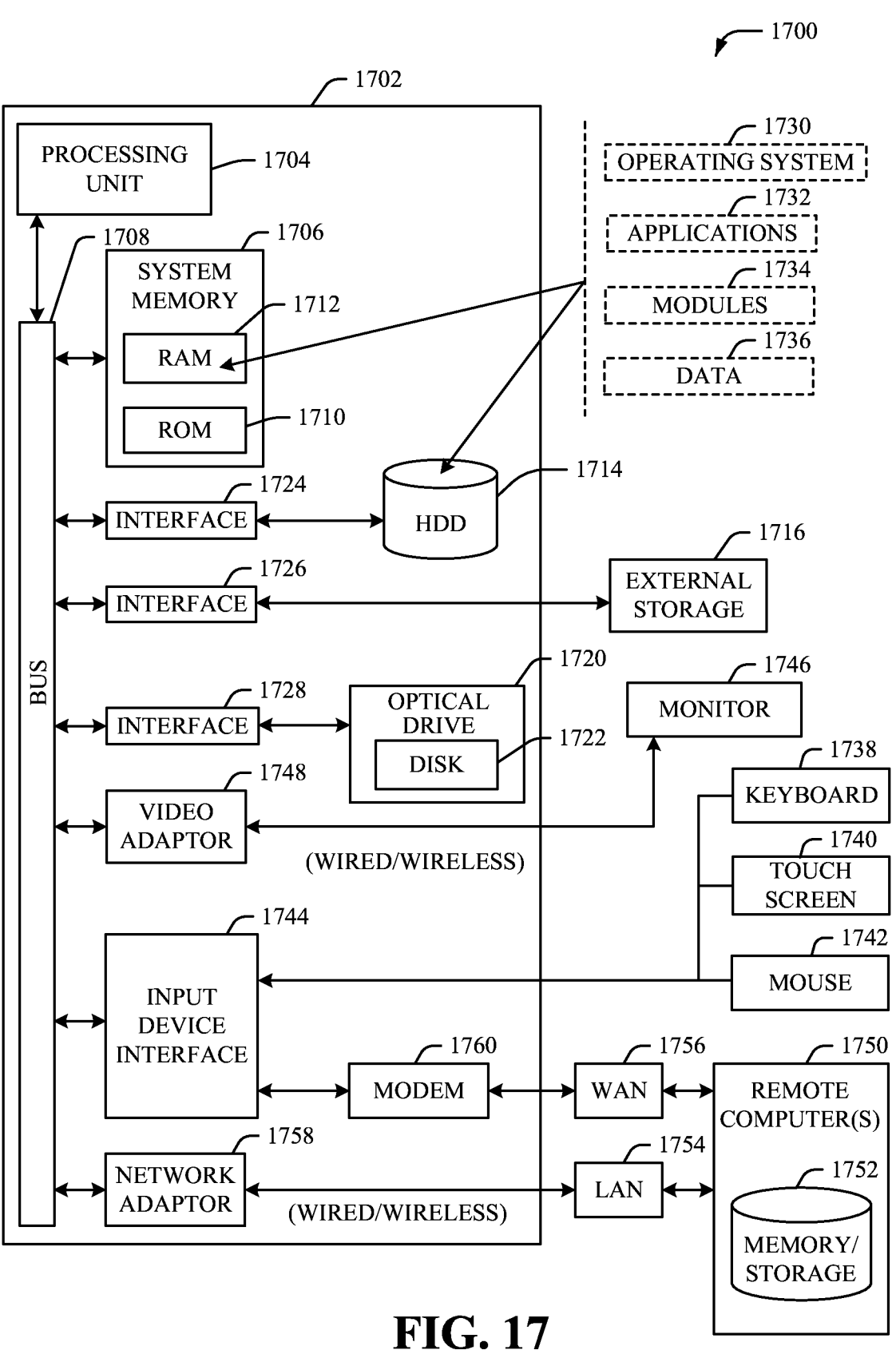
FIG. 17 illustrates an example block diagram of an example computer/machine system operable to engage in a system architecture that facilitates wireless communications according to one or more embodiments described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM

1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD), non-volatile memory and other storage technology could be used in addition to, or in place of, an HDD 1614, and can be internal or external. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally include emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can include one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/ storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 16 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:

a processor; and a memory that stores executable instructions that, when executed by the processor of the system, facilitate performance of operations, the operations comprising:

receiving a reservation request for reservation of a collaboration space within a virtual reality environment;

in response to the reservation request, identifying a virtual location within the virtual reality environment for the collaboration space;

receiving an access request, via a first device, of a first entity, the first entity being authorized to access the collaboration space;

in response to the access request, enabling access for the first entity to the collaboration space within the virtual reality environment;

detecting that a particular second entity associated with a second device is engaged in an activity, wherein the detecting comprises detecting user actions of the second entity that relate to the activity;

automatically performing a search for one or more collaboration spaces within the virtual reality environment based on the detecting that the second entity is engaged in the activity;

responsive to the performing the search, identifying that the activity is within a context corresponding to the collaboration space;

based on the identifying that the activity is within the context corresponding to the collaboration space, causing a prompt to join the collaboration space to be presented at the second device;

after the causing, receiving, from the second device, an acceptance to join the collaboration space; and responsive to the acceptance, enabling the second device to access the collaboration space.

2. The system of claim 1, wherein the virtual location for the collaboration space comprises virtual coordinate data.

3. The system of claim 1, wherein the reservation request is associated with collaboration context data applicable to the collaboration space.

4. The system of claim 3, wherein the operations further comprise sending a notification, based on the collaboration context data, to the first entity.

5. The system of claim 3, wherein the operations further comprise advertising a searchable reference to the collaboration space based on the collaboration context data.

6. The system of claim 1, wherein the operations further comprise determining that the first entity is authorized to access the collaboration space, comprising evaluating permission data associated with the first entity.

7. The system of claim 6, wherein presentation of a virtual reality element within the collaboration space to the requesting-first entity is dependent on the permission data associated with the first entity.

8. The system of claim 1, wherein the operations further comprise determining that the first entity is not authorized for admission to the collaboration space without accepting limitation data, offering the limitation data to the first entity, and receiving acceptance of the limitation data from the first entity.

9. The system of claim 1, wherein the access request is a first access request, wherein the first entity is associated with first permission data, wherein the operations further comprise receiving a second access request via a device of a third entity authorized to access the collaboration space, and wherein the third entity is associated with third permission data that is different from the first permission data.

10. The system of claim 9, wherein the operations further comprise presenting, based on the first permission data, a virtual reality element to the first entity, and not presenting, based on the third permission data, the virtual reality element to the third entity.

11. The system of claim 1, wherein the operations further comprise communicating, via the collaboration space, a message, via a third device, determined to be associated with a third entity, the third entity being authorized to access the collaboration space.

12. The system of claim 1, wherein the receiving the reservation request for the reservation of the collaboration space comprises detecting an action by a reserving entity.

13. The system of claim 1, wherein the collaboration space is associated with collaboration context data applicable to the collaboration space, and wherein an environment of the collaboration space is based on the collaboration context data.

14. A method, comprising:

receiving, by a system comprising a processor, a reservation request for reservation of a collaboration space within a virtual reality environment, wherein the request is associated with collaboration context data;

identifying, by the system, virtual location coordinate data for the collaboration space;

reserving, by the system, the virtual location coordinate data for the collaboration space in association with the collaboration context data;

outputting, by the system directed to a first entity via a first device associated with the first entity, notification data based on the collaboration context data;

receiving, by the system via the first device, an access request from the first entity for access to the collaboration space;

in response to the access request, authorizing, by the system via the first device, access to the collaboration space within the virtual reality environment to the first entity;

detecting, by the system, that a second entity associated with a second device is performing an action with respect to an activity;

automatically performing, by the system, a search for one or more collaboration spaces within the virtual reality environment based on the detecting that the second entity is performing the action with respect to the activity;

responsive to the performing the search, identifying, by the system, that the activity is associated with the collaboration context data for the collaboration space;

based on the identifying that the activity is associated with the collaboration context data for the collaboration space, causing, by the system, a prompt to join the collaboration space to be presented at the second device;

after the causing, receiving, by the system and from the second device, an acceptance to join the collaboration space; and responsive to the acceptance, enabling, by the system, the second device to access the collaboration space.

15. The method of claim 14, further comprising, prior to the outputting the notification data, determining, by the system, that the first entity has permission to access the collaboration space.

16. The method of claim 14, further comprising, prior to the authorizing the access to the first entity, determining, by the system, that the first entity has permission to access the collaboration space.

17. The method of claim 14, further comprising:

obtaining, by the system, a virtual reality element for presentation within the collaboration space, determining, by the system, whether the first entity has permission to experience the virtual reality element, in response to determining that the first entity has permission to experience the virtual reality element, presenting, by the system, the virtual reality element within the collaboration space to the first entity, and in response to determining that the first entity does not have permission to experience the virtual reality element, preventing, by the system, the presenting of the virtual reality element within the collaboration space to the first entity.

18. A non-transitory machine-readable medium, comprising executable instructions that, when executed by a processor, facilitate performance of operations, the operations comprising:

admitting a first entity to a collaboration space in a virtual reality environment based on first permission data of the first entity;

admitting a second entity to the collaboration space based on second permission data of the second entity that is different from the first permission data;

obtaining a virtual reality element for presentation within the collaboration space;

determining, based on the first permission data, that the first entity has permission to experience the virtual reality element;

in response to the determining that the first entity has permission to experience the virtual reality element, presenting the virtual reality element within the collaboration space to the first entity;

determining, based on the second permission data, that the second entity does not have permission to experience the virtual reality element;

in response to the determining that the second entity does not have permission to experience the virtual reality element, preventing the presenting of the virtual reality element to the second entity;

detecting that a third entity associated with a third device is engaged in an activity, wherein the detecting comprises detecting user actions of the third entity that relate to the activity;

automatically performing a search for one or more collaboration spaces within the virtual reality environment based on the detecting that the third entity is engaged in the activity;

responsive to the performing the search, identifying that the activity is within a context corresponding to the collaboration space;

based on the identifying that the activity is within the context corresponding to the collaboration space, causing a prompt to join the collaboration space to be presented at the third device;

after the causing, receiving, from the third device, an acceptance to join the collaboration space; and responsive to the acceptance, enabling the third device to access the collaboration space.

19. The non-transitory machine-readable medium of claim 18, wherein the virtual reality element is a first virtual reality element, and wherein the operations further comprise:

admitting a fourth entity to the collaboration space based on fourth permission data of the fourth entity that is different from the first permission data and the second permission data;

obtaining a second virtual reality element for presentation within the collaboration space;

determining, based on the first permission data, that the first entity has permission to experience the second virtual reality element;

in response to the determining that the first entity has permission to experience the second virtual reality element, presenting the second virtual reality element within the collaboration space to the first entity;

determining, based on the second permission data, that the second entity has permission to experience the second virtual reality element;

in response to the determining that the second entity has permission to experience the second virtual reality element, presenting the second virtual reality element within the collaboration space to the second entity;

determining, based on the fourth permission data, that the fourth entity does not have permission to experience the second virtual reality element; and in response to the determining that the fourth entity does not have permission to experience the second virtual reality element, preventing the presenting of the second virtual reality element to the fourth entity.

20. The non-transitory machine-readable medium of claim 18, wherein the operations further comprise maintaining data representing the collaboration space in association with collaboration context data applicable to the collaboration space.

* * * * *